(12) United States Patent
Croxford et al.

(10) Patent No.: US 9,158,941 B2
(45) Date of Patent: Oct. 13, 2015

(54) MANAGING ACCESS TO CONTENT IN A DATA PROCESSING APPARATUS

(75) Inventors: Daren Croxford, Burwell (GB); Donald Felton, Ely (GB); Daniel Kershaw, Cambridge (GB); Peter Brian Wilson, Waterbeach (GB)

(73) Assignee: ARM Limited, Cambridge (GB)

( * ) Notice: Subject to any disclaimer, the term of this patent is extended or adjusted under 35 U.S.C. 154(b) by 3047 days.

(21) Appl. No.: 11/376,733

(22) Filed: Mar. 16, 2006

(65) Prior Publication Data

US 2007/0220276 A1  Sep. 20, 2007

(51) Int. Cl.
*G06F 17/30* (2006.01)
*G06F 21/79* (2013.01)
*G06F 12/14* (2006.01)
*G06F 21/74* (2013.01)

(52) U.S. Cl.
CPC .............. *G06F 21/79* (2013.01); *G06F 12/145* (2013.01); *G06F 21/74* (2013.01)

(58) Field of Classification Search
USPC .......................... 726/26, 27; 713/193; 705/51
See application file for complete search history.

(56) References Cited

U.S. PATENT DOCUMENTS

| | | | |
|---|---|---|---|
| 6,820,177 B2* | 11/2004 | Poisner ........................ | 711/152 |
| 7,149,862 B2 | 12/2006 | Tune et al. | |
| 7,185,159 B2 | 2/2007 | Beinet et al. | |
| 7,305,534 B2 | 12/2007 | Watt et al. | |
| 7,581,252 B2* | 8/2009 | Challener et al. ............... | 726/24 |
| 2003/0188173 A1* | 10/2003 | Zimmer et al. ................ | 713/189 |

(Continued)

FOREIGN PATENT DOCUMENTS

| | | |
|---|---|---|
| EP | 1984864 | 10/2008 |
| GB | 2 411 027 | 8/2005 |

(Continued)

OTHER PUBLICATIONS

Secutor Systems, Inc. Data Vault X4 v1.0, EAL4 Security Target, Version 1.0, Sep. 2005, pp. 1-37.

(Continued)

*Primary Examiner* — Beemnet Dada
*Assistant Examiner* — Sayed Beheshti Shirazi
(74) *Attorney, Agent, or Firm* — Nixon & Vanderhye P.C.

(57) ABSTRACT

A data processing apparatus and method are provided for managing access to content within the data processing apparatus. The data processing apparatus has a secure domain and a non-secure domain and comprises at least one device which is operable when seeking to access content stored in memory to issue a memory access request pertaining to either the secure domain or the non-secure domain. Further, writeable memory is provided which can store content required by the at least one device, with the writeable memory having at least one read only region whose content is stored therein under control of a secure task, the secure task being a task executed by one of the devices in the secure domain. Protection logic is then used in association with the writeable memory, which on receipt of a memory access request seeking to access content in the at least one read only region, prevents access to that read only region if that memory access request pertains to the non-secure domain and is seeking to write content to the read only region. This enables the speed, power and flexibility benefits of placing content in writeable memory to be achieved without prejudicing the security of that content, by ensuring that that content cannot be modified from the non-secure domain.

19 Claims, 6 Drawing Sheets

(56) References Cited

U.S. PATENT DOCUMENTS

| | | | |
|---|---|---|---|
| 2004/0088513 A1 | 5/2004 | Biessener et al. | |
| 2004/0170046 A1 | 9/2004 | Belnet et al. | |
| 2004/0177261 A1* | 9/2004 | Watt et al. | 713/193 |
| 2004/0177269 A1* | 9/2004 | Belnet et al. | 713/200 |
| 2005/0160210 A1 | 7/2005 | Watt et al. | |
| 2005/0193081 A1* | 9/2005 | Gruber et al. | 709/212 |
| 2005/0210231 A1* | 9/2005 | Bouchier et al. | 713/1 |
| 2005/0278530 A1* | 12/2005 | England et al. | 713/168 |
| 2005/0278531 A1* | 12/2005 | England et al. | 713/168 |
| 2006/0026338 A1* | 2/2006 | Ebara et al. | 711/103 |
| 2006/0129791 A1* | 6/2006 | Kwon | 713/1 |
| 2006/0143411 A1* | 6/2006 | O'Connor | 711/153 |
| 2006/0156036 A1* | 7/2006 | Oh et al. | 713/193 |
| 2006/0265605 A1* | 11/2006 | Ramezani | 713/193 |
| 2006/0282734 A1* | 12/2006 | Milne et al. | 714/742 |
| 2007/0220276 A1 | 9/2007 | Croxford et al. | |
| 2008/0155258 A1* | 6/2008 | Obereiner et al. | 713/168 |

FOREIGN PATENT DOCUMENTS

| | | |
|---|---|---|
| JP | 2004171563 | 6/2004 |
| WO | WO 2007/090719 A3 | 8/2007 |

OTHER PUBLICATIONS

United Kingdom Official Action, May 20, 2010, in corresponding Great Britain application No. GB060608533.6.

Japanese Office Action (without translation), May 20, 2011, in corresponding Japanese Application No. 2006-212773.

* cited by examiner

MANAGING ACCESS TO CONTENT IN A
DATA PROCESSING APPARATUS

TECHNICAL FIELD

The technology described herein relates to techniques for managing access to content in a data processing apparatus.

BACKGROUND

A data processing apparatus will typically include one or more devices, for example a central processing unit (CPU), a Direct Memory Access (DMA) engine, a hardware accelerator, etc for performing sequences of processing operations. Program code defining the sequence of operations, and/or data required when performing such processing operations, will typically be stored within a memory of the data processing apparatus. The term "contents" will be used herein to collectively identify program code and/or data required when executing such code.

Where content needs to be protected, it is known to provide read only storage devices, for example Read Only Memory (ROM), or lockable FLASH devices, to store such data. With lockable devices such as a lockable FLASH device, the content that is required to be read only is stored within the FLASH device at initial program time, and thereafter a hardware mechanism is used to lock that content within the device so that it is from that point on only readable rather than writeable.

A typical example that uses such an approach is the storage of computer file systems, where the read only protection is controlled by the operating system under the assumption that the operating system is a trustable infrastructure.

Whilst such read only storage devices provide protection for the content, they are typically relatively slow to access, and this can significantly impact on the speed of operation of the data processing apparatus. Further, they lack flexibility with regard to how the content is accessed, since it is not possible to subsequently alter that content.

The above described approach relies on the read only nature of the memory device to provide protection to the content stored therein. As an alternative approach where quicker access to the content is required, it is known in relation to content required by a CPU to store that content in a writeable memory device, and then to use a Memory Management Unit (MMU) associated with the CPU to only allow certain portions of memory to be read but not written, this being defined by page tables accessible to the MMU. This process is controlled by the operating system, and hence again relies on the operating system being a trustable infrastructure.

It has typically been the job of the operating system developer to ensure that the operating system provides sufficient security to ensure that the secure data of one application cannot be accessed by other applications running under the control of the operating system. However, as systems become more complex, the general trend is for operating systems to become larger and more complex, and in such situations it becomes increasingly difficult to ensure sufficient security within the operating system itself. To seek to alleviate the reliance on operating system security, it is known to provide a system in which the data processing apparatus is provided with secure and non-secure domains, these domains providing a mechanism for handling security at the hardware level. Such a system is described for example in U.S. patent application Ser. No. 10/714,561, now U.S. Pat. No. 7,305,534, the contents of which are herein incorporated by reference. In such a system, the non-secure and secure domains in effect establish separate worlds, the secure domain providing a trusted execution space separated by hardware enforced boundaries from other execution spaces, and likewise the non-secure domain providing a non-trusted execution space.

Whilst such an approach enables secure content to be stored in a way where it can only be accessed by devices operating in the secure domain, there is still the problem that it may be necessary to provide access from the non-secure domain to certain non-secure content whilst ensuring that that content cannot be modified by applications running in the non-secure domain. Typically, it has only been possible to protect such content by storing that content in one of the earlier-described read only storage devices, for example one-time-programmable devices, or lockable memory devices like lockable FLASH devices. However, as mentioned earlier, this suffers from the performance problems and flexibility problems discussed earlier.

SUMMARY OF THE INVENTION

Viewed from a first aspect, the technology described herein provides a data processing apparatus having a secure domain and a non-secure domain, in the secure domain devices of the data processing apparatus having access to secure content which is not accessible in the non-secure domain, the data processing apparatus comprising: at least one device operable when seeking to access content stored in memory to issue a memory access request pertaining to either said secure domain or said non-secure domain; writable memory operable to store content required by the at least one device, the writeable memory having at least one read only region whose content is stored therein under control of a secure task, the secure task being a task executed by one of said at least one devices in the secure domain; and protection logic operable to receive a memory access request seeking to access content in the at least one read only region, and to prevent access to the at least one read only region if that memory access request pertains to said non-secure domain and is seeking to write content to said at least one read only region.

A data processing apparatus has a secure domain and non-secure domain, and writeable memory is provided having at least one read only region, which is read only to the non-secure domain access rights. Content is stored in such a read only region under the control of a secure task executed by a device of the data processing apparatus in the secure domain. Then, protection logic is used to prevent access to the at least one read only region if a memory access request seeking to access content in that read only region pertains to the non-secure domain and is seeking to write content to that read only region.

By such an approach, devices can be given read only access to content from the non-secure domain, where that content is stored in a writeable memory, and hence can be accessed more quickly, and typically with consumption of less power, than if a traditional read only memory device were used. The protection logic ensures that any content in the read only region cannot be written to from the non-secure domain, whilst the integrity of the content stored in the read only region of the writeable memory is ensured since it can only be stored into that read only region by a secure task executed by a device in the secure domain.

Hence, the speed, power and flexibility benefits of storing the content in writeable memory can be realised without any loss of integrity of that content since it cannot be modified from the non-secure domain.

The data processing apparatus may comprise a device which has the capability to transmit in and out of the hardware backed secure domain, and hence can spend part of its time executing in the secure domain and part of its time executing in the non-secure domain. Alternatively, or in addition, the data processing apparatus may include devices which can only execute in one domain or the other and hence in one embodiment the data processing apparatus may have one or more devices which can execute in the secure domain and one or more separate devices which can execute in the non-secure domain.

The writeable memory may be constituted from a single memory device, or may comprise a number of separate memory devices which collectively form the writeable memory.

In addition to storing non-secure content which can be accessed in a read-only manner from the non-secure domain, a read only region may also have stored therein some secure content. In such instances, known mechanisms such as those described in the earlier-mentioned U.S. patent application Ser. No. 10/714,561 can be used to ensure that such secure content is not accessed (whether a write or a read access) from the non-secure domain.

The protection logic may be arranged to monitor the memory access request to the at least one read only region in a variety of ways. However, in one embodiment the data processing apparatus further comprises a device bus on to which the at least one device is operable to issue said memory access request, with the writeable memory being coupled to the device bus via the protection logic. Hence, all accesses to the at least one read only region of the writeable memory are routed through the protection logic.

The one or more devices of the data processing apparatus that access content stored in memory by issuing associated memory access requests can take a variety of forms. In one embodiment, at least one of the at least one devices is operable in a plurality of modes, including at least one non-secure mode being a mode in the non-secure domain and at least one secure mode being a mode in the secure domain; and the secure task used to control storage of content in the at least one read only region is executed in a predetermined secure mode. Hence, whilst the secure domain and non-secure domain provide separate execution spaces separated by hardware enforced boundaries, for such devices different modes of operation can also be provided, for example a user mode, a privileged mode, etc. In one embodiment, such a device may be a CPU. Such modes of operation are typically controlled by the operating system applicable to that device when executing in a particular domain. In such embodiments, the secure task that stores content in the at least one read only region may be executed in a predetermined secure mode, for example a secure privileged mode.

In one embodiment there may be multiple secure domain capable devices. In such embodiments, the protection logic may be arranged such that only one of those multiple secure domain capable devices is allowed to store content in the at least one read only region. In particular, the protection logic may be allowed to only allow a device that is using a particular CPU ID, process ID, or operating state (e.g. secure privileged mode), or a combination thereof, to have write access to the read only region.

In one embodiment, in the non-secure domain said at least one of said at least one devices is operable under the control of a non-secure operating system, and in said secure domain said at least one of said at least one devices is operable under the control of a secure operating system. Hence, in such embodiments different operating systems are used within the device, dependent on the domain that the device is executing in. The secure operating system will typically be significantly smaller than the non-secure operating system and can be viewed as a secure kernel provided to control certain secure functions.

There are a number of ways in which the secure task can be used to control storage of content in a read only region. In one embodiment, the secure task is used during a boot process to cause content to be stored in that read only region. In one such embodiment, it is envisaged that following the boot process, the content in the at least one read only region will not then be subsequently altered.

In one particular embodiment, the content comprises program code to be executed by said at least one device in the non-secure domain, and said secure task is operable to cause that program code to be written into the at least one read only region from a storage device during the boot process. Typically, the storage device from which the program code is transferred will be relatively slow storage when compared with the writeable memory, and hence subsequent to this process being performed by the secure task, that program code can then be accessed much more quickly through access to the read only region of the writeable memory. Further, this program code cannot be modified from the non-secure domain, since the protection logic ensures that all accesses from the non-secure domain are read only accesses.

In one embodiment, the secure task is further operable to cause a verification process to be performed on the program code. This enables the secure task executing in the secure domain to verify the integrity of the program code before it is stored in the read only region of the writeable memory, and hence before access to that content is available from the non-secure domain. The verification process may take a variety of forms, and may for example involve verifying the integrity of the program code using standard block signature checking methods. Only if such verification processing indicates that the program code is valid and has not been tampered with, i.e. is legitimate code for access by the non-secure domain, will the program code then be stored in the at least one read only region of the writeable memory.

In one embodiment, it is envisaged that there would be no legitimate reason for a non-secure task, i.e. a task being executed by a device in the non-secure domain, to seek to alter the content stored in the at least one read only region. However, in an alternative embodiment where there may be envisaged to be a legitimate reason for the non-secure task to seek to update such content, then the device on which that non-secure task is executing can be arranged to trap the corresponding memory access request, and to cause the memory access request to be handled by the secure task. Depending on the type of device on which the non-secure task is executing, this may actually involve the transfer of that memory access request to a separate device that can operate in a secure domain, or alternatively may involve the same device transitioning from the non-secure domain to the secure domain, whereafter the secure task can then be run on that device. By such an approach, it is possible for the non-secure task to instigate a change to the content in the read only region, but any such update to the content is actually performed by the secure task, and accordingly the integrity of the content is ensured.

In one particular embodiment, the secure task is operable to perform a verification process in order to check that the memory access request is not seeking to access secure content, and provided secure content is not seeking to be accessed, is operable to issue the memory access request. By such an approach, the secure task can ensure that the non-secure task is not seeking to alter content that it should not be allowed to modify, before allowing the memory access request to proceed.

The writeable memory may take a variety of forms. In one embodiment, one of the at least one read only regions is provided within a peripheral device controllable by code executing in the secure domain. Hence, whilst the peripheral device is controlled from the secure domain, read only access is provided to that peripheral device from the non-secure domain, for example to enable data to be read. A possible example might be an Ethernet device or a system level MMU device with read only exposed page tables.

One type of memory device which it has typically been difficult to use effectively within a data processing apparatus having a secure domain and a non-secure domain is a FLASH memory device. Whereas for many memory devices, the addresses issued to those memory devices can be monitored to see whether secure data is seeking to be accessed from the non-secure domain, since it will be known which areas of the memory contain secure data and which areas of the memory contain non-secure data, such an approach cannot reliably be used in association with write operations to FLASH memory devices, since the addresses being accessed within the FLASH memory device cannot readily be deduced from the format of the write access request issued to the FLASH memory device. For read accesses, the addresses being accessed can typically be determined, thereby allowing read accesses to secure content to be monitored to only allow such accesses to take place if they pertain to the secure domain. However, the inability to perform such checks for write operations give rise to security issues.

In particular, the bus connected to the FLASH memory device will typically have an address channel and a data channel, but the address channel is also used to issue FLASH commands (for example block erase, copy, write, etc) to the FLASH memory device. These FLASH commands do not themselves specify an address. Hence, at the time these FLASH commands are issued, it is not possible for protection logic external to the FLASH memory to reliably identify what content is seeking to be accessed within the FLASH memory device. Furthermore, when the addresses are subsequently identified they may be identified with reference to segment identifiers identifying particular segments within the FLASH device, which again may not readily be understood by protection logic external to the FLASH device. For these reasons, the use of FLASH memory devices within a data processing apparatus having a secure domain and a non-secure domain have always raised security issues, since it would be possible for FLASH commands to be submitted from the non-secure domain, with these commands being used to copy data from a secure region to a non-secure region within the FLASH memory, thereby allowing access from the non-secure domain to secure content.

However, in accordance with an embodiment, the writeable memory may comprise a FLASH memory device and the at least one read only region comprises the entire FLASH memory device, whereby a non-secure task being a task executed by said at least one device in the non-secure domain can only read content in the FLASH memory device. As mentioned earlier, existing mechanisms can then ensure that a read access from the non-secure domain is not allowed to access any secure content in the read only region. Accordingly, given that the protection logic additionally ensures that any access from the non-secure domain can only read content in the FLASH memory device, and given that the content stored in the read only region is controlled by a secure task executing in the secure domain, the above potential security issues with FLASH memory devices are alleviated, thereby enabling such FLASH memory devices to be used within a data processing apparatus having a secure domain and a non-secure domain without prejudicing validity or integrity.

In one embodiment, each memory access request has a domain signal associated therewith identifying whether the memory access request pertains to the secure domain or the non-secure domain, and the protection logic is operable to reference the domain signal in order to determine whether the memory access request pertains to the non-secure domain. In one embodiment, the domain signal is asserted at the hardware level, and hence can only be set to indicate that the memory access request pertains to the secure domain if the device itself is operating in the secure domain. Hence, it would not be possible for a rogue application executing on the device to tamper with the setting of the domain signal.

The at least one read only region within the writeable memory can be established in a variety of ways. However, in one embodiment the at least one read only region is definable by a secure task in the secure domain, thereby ensuring that the read only regions can only be established under the control of that secure task. This secure task may or may not be the same secure task that is used to control the storage of content into the defined read only region(s).

Viewed from a second aspect, the technology described herein provides memory logic for a data processing apparatus having a secure domain and a non-secure domain, in the secure domain devices of the data processing apparatus having access to secure content which is not accessible in the non-secure domain, the data processing apparatus having at least one device operable when seeking to access content stored in the memory logic to issue a memory access request pertaining to either said secure domain or said non-secure domain, the memory logic comprising: writeable memory operable to store content required by the at least one device, the writeable memory having at least one read only region whose content is stored therein under control of a secure task, the secure task being a task executed by one of said at least one devices in the secure domain; and protection logic operable to receive a memory access request seeking to access content in the at least one read only region, and to prevent access to the at least one read only region if that memory access request pertains to said non-secure domain and is seeking to write content to said at least one read only region.

Viewed from a third aspect, the technology described herein provides a method of managing access to content in a data processing apparatus having a secure domain and a non-secure domain, in the secure domain devices of the data processing apparatus having access to secure content which is not accessible in the non-secure domain, the method comprising the steps of: providing within a writeable memory at least one read only region; storing content within the at least one read only region under control of a secure task, the secure task being a task executed by a device in the secure domain; and when a memory access request is issued seeking to access content in the at least one read only region, preventing access to the at least one read only region if that memory access request pertains to said non-secure domain and is seeking to write content to said at least one read only region.

DETAILED DESCRIPTION OF EXAMPLE EMBODIMENTS

Figure 1:
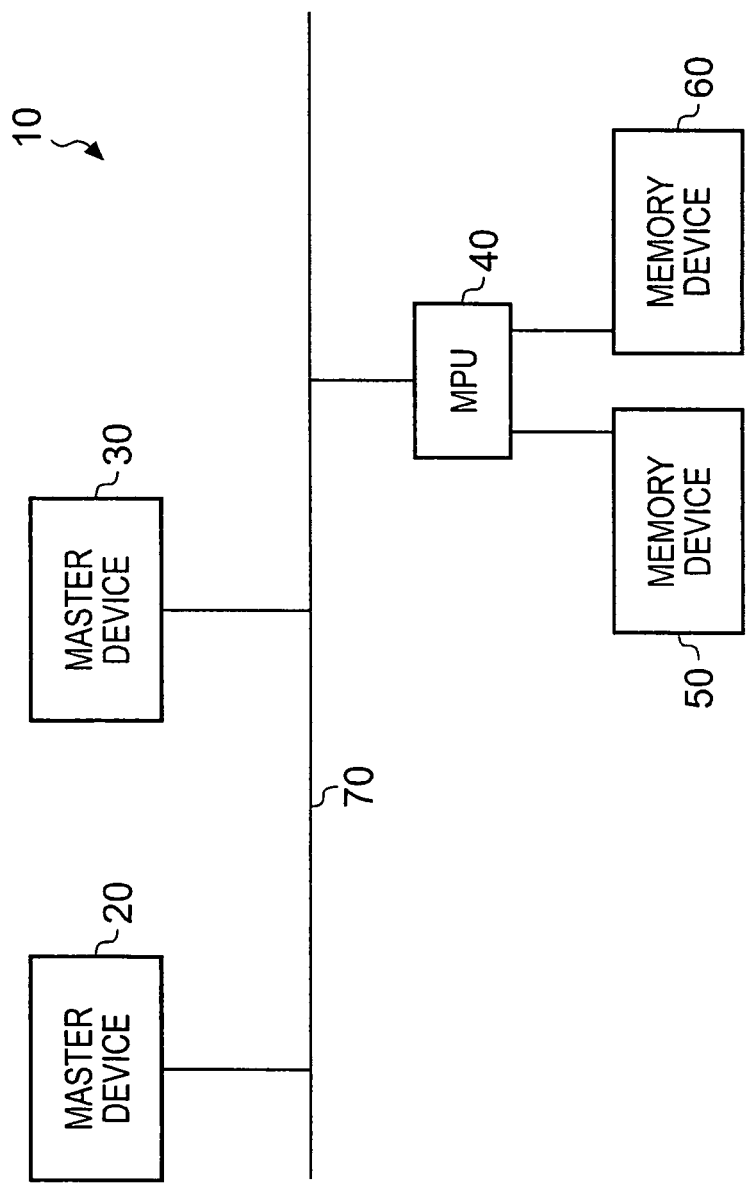
FIG. 1 is a block diagram of a data processing apparatus in accordance with an example embodiment.

FIG. 1 is a block diagram of a data processing apparatus in accordance with one example embodiment. As shown in FIG. 1, the data processing apparatus may include a number of master devices 20, 30 coupled via a bus structure 70 with a number of memory devices 50, 60 used to store content for access by the master devices 20, 30. The master devices 20, 30 can take a variety of forms, for example a CPU, a DMA engine, hardware accelerator logic such as a data engine, etc. Further, whilst in FIG. 1 the bus structure 70 is shown as a simple bus, it may in practice be formed by interconnect logic providing a plurality of connection paths for routing signals between the various devices connected thereto.

To access content in the memory devices 50, 60, transactions are performed over the bus structure 70. A transaction typically consists of an address transfer from a master device 20, 30 to a desired slave device, in this example one of the memory devices 50, 60, and one or more data transfers between that master device and slave device. For a write transaction these data transfers will pass from the master device to the memory device, whilst for a read transaction these data transfers will pass from the memory device to the master device.

A memory protection unit (MPU) 40 is provided for protecting access to content in the memory devices 50, 60 with the aim of ensuring that content is not accessed by an application that is not entitled to access that content.

In one embodiment, the data processing apparatus 10 has a secure domain and a non-secure domain, the secure domain providing a trusted execution space separated by hardware enforced boundaries from other execution spaces. Hence, content handled by the trusted execution space can be treated as secure content which is not accessible from the non-secure domain, or indeed from any non-trusted execution space. Hence, the secure and non-secure domains provide a mechanism for handling security at the hardware level, by in effect establishing separate worlds, which can ensure that secure content belonging to the secure domain cannot be accessed by any applications running in the non-secure domain.

The memory devices 50, 60 can be arranged such that one or more secure regions are defined therein for storing secure content and one or more non-secure regions are defined therein for storing non-secure content. The MPU 40 can be arranged to police accesses to the memory devices 50, 60 in order to ensure that no access to the secure memory regions occurs when a memory access request initiating a transaction is issued by a master device pertaining to the non-secure domain. Such an MPU is described in the earlier-mentioned U.S. patent application Ser. No. 10/714,561.

However, whilst such an approach enables secure content to be stored in a way where it can only be accessed by devices operating in the secure domain, a further problem that exists is that of providing access from the non-secure domain to certain non-secure content whilst ensuring that that content cannot be modified by applications running in the non-secure domain. Typically, it has only been possible to protect such content by storing that content in a read only storage device, and hence relying on the hardware arrangement of the storage device itself to protect that content from being modified.

However, as will be discussed further herein, in accordance with an example embodiment, at least one of the memory devices 50, 60 will be a writeable memory device in which can be defined a read only region. Content is then stored in this read only region under control of a secure task executed by one of the master devices 20, 30 in the secure domain. This ensures that the read only region can only be written to from the secure domain, and the secure task responsible for writing the content can perform any appropriate verification processes prior to storing the content in that memory device. In addition, the MPU 40 is provided with additional functionality such that when a memory access request is seeking to access content in such a read only region of the writeable device, the MPU 40 prevents access to that read only region if the memory access request pertains to the non-secure domain and is seeking to write content to the read only region. Since the MPU 40 is associated with the memory device, such protection cannot be circumvented by trying to run a rogue application on a different master device coupled to the bus structure 70, since the MPU 40 will still ensure that any write access attempt to the read only region from the non-secure domain is blocked.

Figure 2:
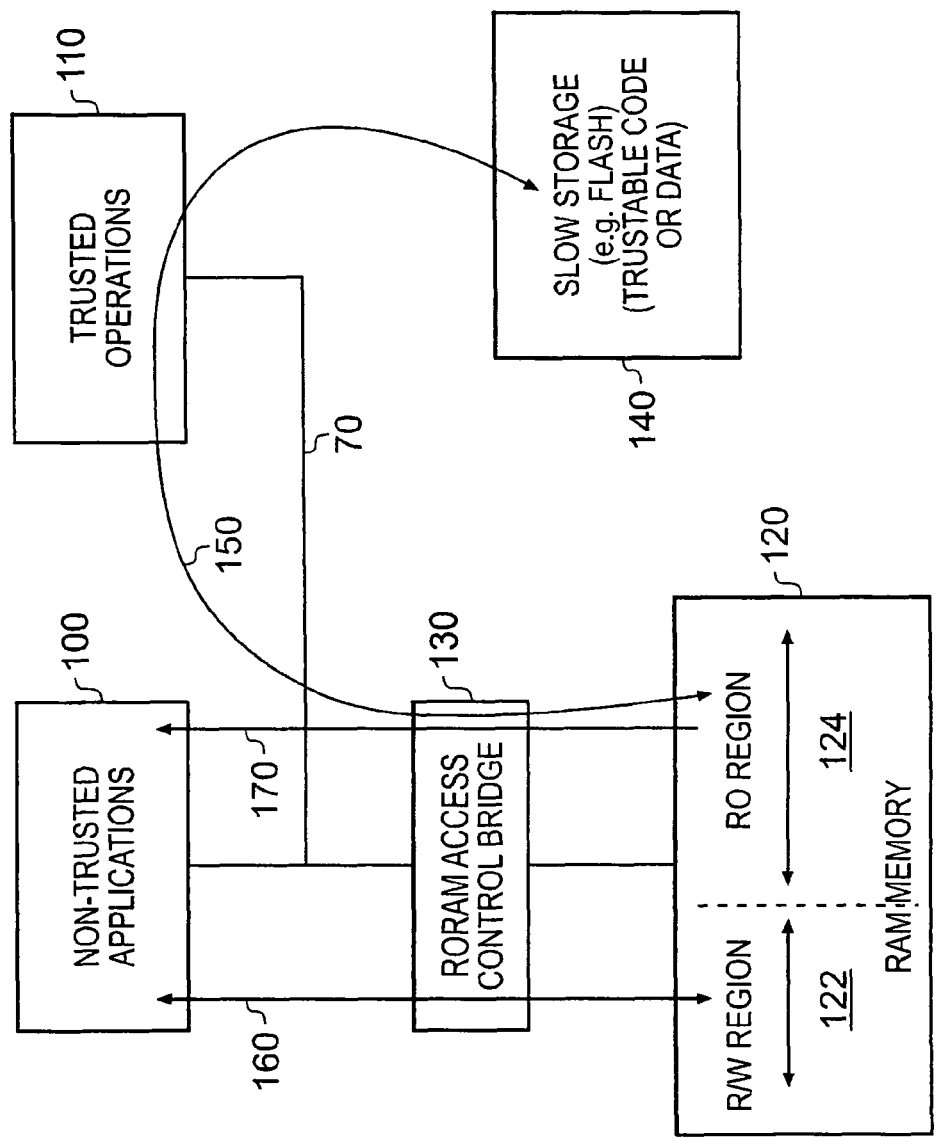
FIG. 2 is a diagram schematically illustrating the management of access to a read only region within a writeable memory device in accordance with one example embodiment.

This process is discussed in more detail with reference to FIG. 2. As shown in FIG. 2, one or more trusted operations 110 may be executed on a master device 20, 30 in the secure domain, whilst in addition one or more non-trusted applications 100 may be executed on a master device 20, 30 in the non-secure domain. In one embodiment, one of the master devices 20, 30 may always execute in the secure domain, and may be arranged to execute the trusted operations 110, whilst a separate master device may be used solely in the non-secure domain to execute non-trusted applications 100. However, alternatively, one or more of the master devices 20, 30 may have the internal capability to transmit between the secure domain and the non-secure domain, and accordingly may spend some of their time executing trusted operations 110 in the secure domain, and other parts of their time executing non-trusted applications 110 in the non-secure domain. A processor having the capability to transition between the secure domain and the non-secure domain is described in the earlier-mentioned U.S. patent application Ser. No. 10/714, 561.

As shown in FIG. 2, the data processing apparatus has RAM memory 120, as used herein the term RAM memory being used to refer to memory that normally has read and write access, which will include for example traditional RAM devices, NOR or NAND FLASH memory devices, FeRAM devices, EEPROM devices, etc. The RAM memory 120 may be formed by one of the memory devices 50, 60, or can be spread across multiple memory devices within the data processing apparatus.

In accordance with an embodiment of the present invention, one or more read only (RO) regions can be defined within the RAM memory, these regions typically being defined by a trusted operation 110, also referred to herein as a secure task. In FIG. 2, for the sake of simplicity, a single RO region 124 is shown, with the remaining portion 122 of the RAM memory 120 being a read/write region.

Accesses to the RAM memory 120 are controlled by the read only RAM (RORAM) access control bridge 130, which in one embodiment forms part of the MPU 40 shown in FIG. 1. In particular, as shown by line 150 in FIG. 2, under the control of a trusted operation 110, content can be stored in the RO region 124 from slow storage 140 provided elsewhere within the system (the slow storage being secure, or having secure regions). This slow storage may for example be a FLASH device, and may be arranged to store trustable content in the form of code or data. Further, as part of the loading procedure, the trusted operation 110 may be arranged to perform some verification process of the content prior to allowing it to be stored in the RO region 124.

Once content has been stored in the RO region 124 under the control of a trusted operation 110, then as shown by the arrows 160, 170, the RORAM access control bridge 130 will ensure that whilst non-trusted applications 100 may have read and/or write access to the read/write region 122 of the RAM memory 120, such non-trusted applications 100 are only given read access to content stored within the RO region 124.

Figure 3:
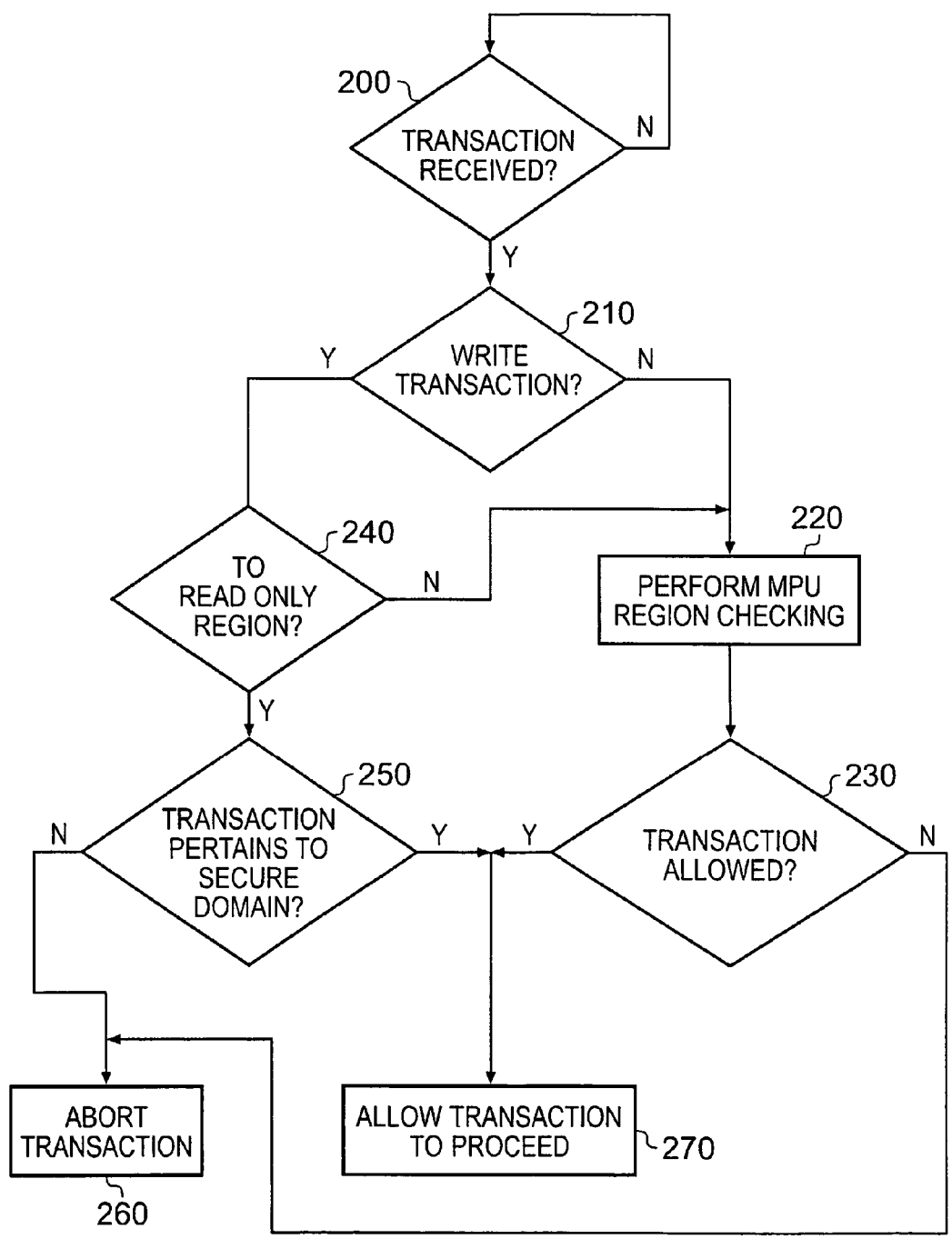
FIG. 3 is a flow diagram schematically illustrating a process performed by the memory protection unit of FIG. 1 in accordance with one example embodiment.

FIG. 3 is a flow diagram illustrating the process performed by the RORAM access control bridge 130 of the MPU 40 in accordance with one example embodiment in order to provide such content protection control for the content stored in the RAM memory 120. At step 200, it is determined whether a transaction has been issued. Once a transaction has been issued, then at step 210 it is determined whether that transaction is a write transaction If it is not, then it will be a read transaction, and the process will proceed to step 220, where standard MPU region checking procedures are performed, as for example were discussed in the earlier-mentioned U.S. patent application Ser. No. 10/714,561. Typically, such procedures will be used to ensure that if a memory access request is issued by a device pertaining to the non-secure domain, then no access to secure content in secure memory is allowed.

Following the checking performed at step 220, it is then determined at step 230 whether the transaction is allowed based on the checks performed, and if so the process proceeds to step 270 where the transaction is allowed to proceed, and accordingly the RAM memory 120 is accessed. Alternatively, if at step 230 it is determined that the transaction should not be allowed, then the transaction is aborted at step 260.

Returning to step 210, if it is determined that the transaction is a write transaction, then at step 240 it is determined whether that transaction is taking place to a RO region of memory. If not, then the process branches to step 220 where the normal region checking procedures take place. However, if the transaction is to the RO region 124, then at step 250 it is determined whether the transaction pertains to the secure domain. If it does, then the transaction is allowed to proceed at step 270. Typically it will not be necessary to perform any MPU region checking in this instance, since typically all content is allowed to be accessed from the secure domain. However, if in alternative embodiments such region checking was considered appropriate, then when it is determined at step 250 that the write transaction pertains to the secure domain, the process could branch to step 220 rather than going directly to step 270.

If at step 250 it is determined that the write transaction does not pertain to the secure domain, then in accordance with this embodiment, the process proceeds to step 260 where the transaction is aborted. This ensures the functionality illustrated in FIG. 2 where no write transactions from the non-secure domain to the RO region 124 are allowed.

In one embodiment, it may be the case that the process of loading content from the slow storage 140 to the RO region 124 as illustrated in FIG. 2 takes place once only at boot time, and thereafter the content stored in the RO region is not changed. However, alternatively, trusted operations 110 may be arranged to periodically change the contents in the RO region 124. Further, in certain embodiments, there may be legitimate reasons for a non-trusted application 100 to wish to alter some of the contents stored in the RO region 124. When adopting the approach discussed earlier with reference to FIGS. 2 and 3, it will be appreciated that the non-trusted applications 100 cannot directly perform such updates since the RORAM access control bridge 130 will prevent any attempt to perform such an update.

Figure 4:
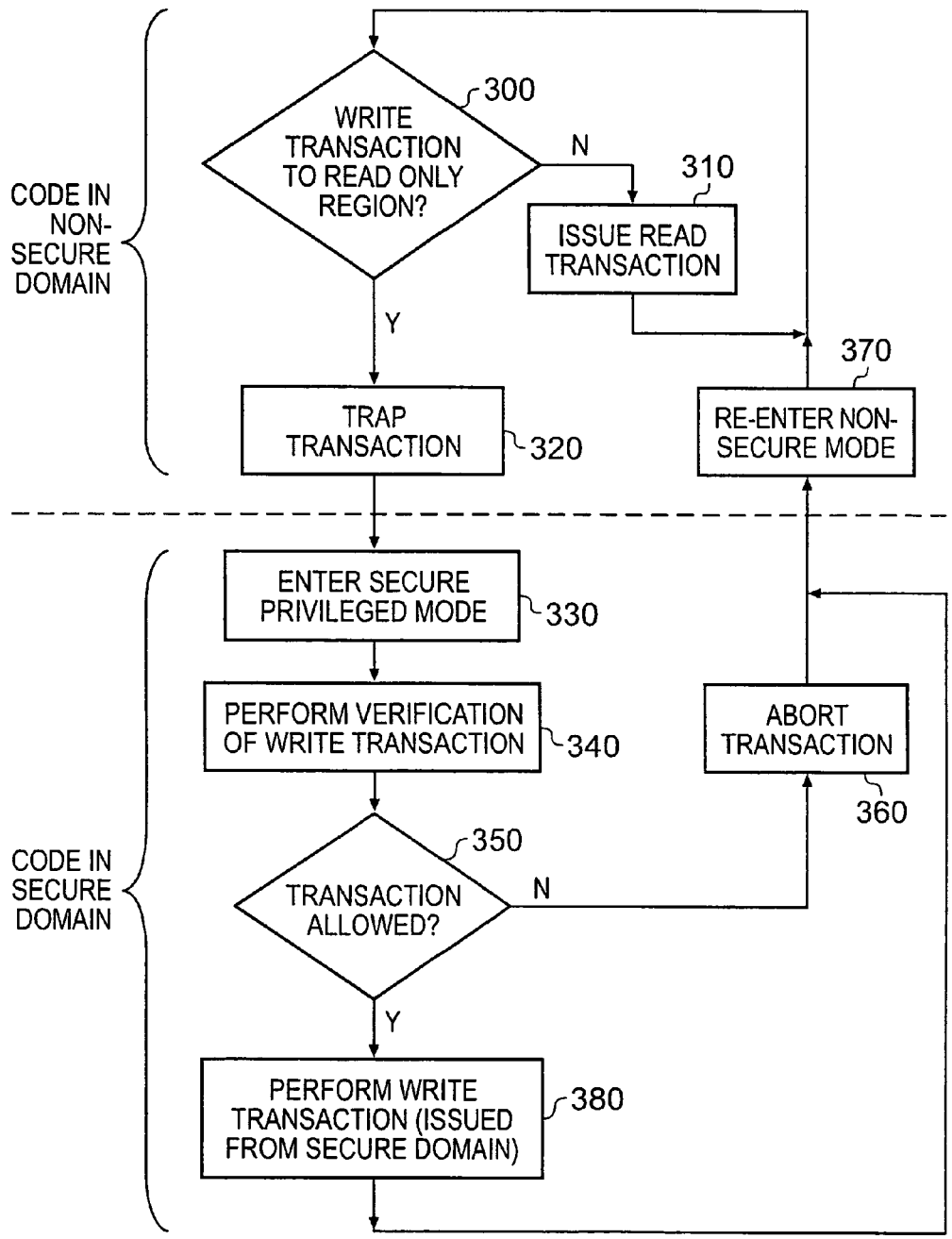
FIG. 4 is a flow diagram schematically illustrating how a write transaction issued to a read only region from code executing in the non-secure domain is handled in accordance with one example embodiment.

However, in one embodiment, a non-trusted application can instigate such an update using the process described schematically in FIG. 4. As shown in FIG. 4, if at step 300 program code executing in the non-secure domain wishes to issue a transaction for access to content in the read only region 124, then at step 300 it is determined whether that transaction is a write transaction to the read only region. If not, then the read transaction is issued at step 310. This will cause the content to be retrieved from the read only region 124 to the relevant non-trusted application 100 as shown by the line 170 in FIG. 2.

However, if it is determined that the transaction is a write transaction at step 300, then at step 320 that transaction is trapped by software. Typically, the determination that the write transaction is seeking to write to the read only region will be made by an MMU or the like with reference to page table descriptors describing whether the particular address being accessed is in a read only region or not. If so, this will cause an exception to be issued which will then trap the transaction at step 320.

When the exception routine is performed, this will cause a transition from the non-secure domain to the secure domain. This transition may occur within the same master device if that master device is capable of operating in either domain, or alternatively it may involve transfer of control from the device executing in the non-secure domain to a different device which is able to execute in the secure domain. Once the transition to the secure domain has taken place, then at step 330 a secure privileged mode is entered, whereafter at step 340 verification processing is performed on the write transaction in order to vet that transaction to ensure that it should be allowed to occur. Such verification processing may involve, for example, referencing the memory map to ensure that the non-secure application is not seeking to access secure memory, and also may take into account other relevant factors, such as the type of command, etc.

Once the verification has been performed, it is then determined at step 350 whether the transaction should be allowed to proceed having regard to the results of that verification. If not, the transaction is aborted at step 360, whereafter at step 370 the non-secure mode in the non-secure domain is re-entered. At this point, the process can return to step 300.

If at step 350, it is determined that the transaction should be allowed, then at step 380 the transaction is performed, but rather than the transaction being issued from the non-secure domain, it is instead issued from the secure domain by the process executing in the secure privileged mode. As a result, this write transaction is seen by the RORAM access control bridge 130 as being issued by a trusted operation 110, and accordingly is allowed to take place. Thereafter, the process can return to step 370 where the non-secure mode in the non-secure domain is re-entered, whereafter the original non-secure program code can continue to execute.

In accordance with the above-described embodiment, it can be seen that a system executing non-trusted applications can have an area of memory within a writeable memory device that is arranged to contain integrity verified content that may not be directly altered by the non-trusted application, but which that non-trusted application can have read access to. This enables fast and power efficient access to the content in that read only region without prejudicing the security of that content. Further, as described, the installation and integrity verification of the content stored in the read only region is performed by a trusted operation executing in the secure domain, i.e. an operation not open to software and/or hardware attack. In addition, the management of access to the read only region is performed by an access control mechanism associated with the memory, based on a knowledge of the domain with which a particular memory access request is associated.

Typically, this knowledge is transmitted over the bus structure 70 by a domain signal which identifies whether the memory access request pertains to the secure domain or the non-secure domain. Preferably, the domain signal is asserted at the hardware level and hence is only assertable by an application which the device executing that application has itself verified is able to be run in the secure domain. Hence, it would not be possible for a rogue application executing on the device to tamper with the setting of the domain signal, since that rogue application would only be executed in the non-secure domain. In one particular embodiment, the device has a predetermined pin for outputting the domain signal onto the bus, and by default the domain signal is set to indicate that the device is operating in a non-secure domain.

The benefits of such an approach can be realised in a variety of situations. For example, in one embodiment, such an approach can be used to guarantee integrity of code segments in a non-trusted environment. A major problem in typical current day systems is that the operating system code used for the non-secure domain is large and hence needs to be run from RAM for power and speed reasons, but innately that RAM is modifiable. In contrast, whilst the integrity can be preserved by instead placing the code in ROM, this has the disadvantage that it is unalterable and generally runs more slowly. However, if the code is copied from ROM into RAM, this improves speed but would typically lose integrity guarantees. Through use of the example embodiments and equivalent technology, this problem is addressed, since the code can be placed in RAM, but the integrity can still be guaranteed, since the code is only loaded into RAM under the control of a secure task operating in the secure domain, and thereafter only read access is provided to that code from the non-secure domain.

Hence, whilst read only memory technology lags behind read/write memory technology in terms of speed, the technology described herein provides the access control of read only memory technology with the improved speed of read/write technology. Further, the inflexibility exhibited by read only memory technology is alleviated, since through the technology described herein, it is possible to store content in read/write memory which is ensured to be read only by a non-trusted application, but which can periodically be altered as required by a trusted operation executing in the secure domain.

Example embodiments can be applied to any memory or memory mapped system. Given that access control is managed by the access control bridge associated with the memory and not at the bus master level, this prevents any circumvention of the protection mechanism by seeking to use alternative bus masters to modify the content in the read only region. In particular, the mechanism of the embodiment of the present invention ensures that irrespective of which bus master issues the request, no write access will be allowed to the read only region from the non-secure domain. Further, the content in the read only region cannot be altered by coding flaws allowing the non-secure execution space to access the control of the read only region, since that control is held elsewhere, namely through the memory access protection methodology applied by the access control bridge 130 associated with the memory.

Further, the technology described herein can be applied to existing technologies fairly readily, since in general it does not require a major re-write of non-trusted operating system code to take advantage of this technology. All that is required is that any operating system code that runs from the read only memory region must not expect to be able to alter memory content inside the memory space that is now declared as read only.

Software integrity verification is commonly performed on either an "as needed" basis (which spot loads the system) or in a background rolling program (which is vulnerable to attacks between checks). However, in accordance with the technology described herein, since the veracity of the code is checked at the time it is loaded into the read only memory by the trusted operation, there is no further testing required.

In one embodiment, the RORAM area may contain the non-trusted operating system core functionality, including any code that it uses to verify the integrity of its operations and code that it might load into normal RAM memory. In one embodiment, the contents of this RORAM may not be altered after boot time, but as mentioned earlier there may be systems where the operating system may request the trusted code to make alterations. However, as described with reference to FIG. 4, such alterations would typically only occur after the trusted code had repeated its verification procedures on any alterations taking place. In addition, a certain amount of "handshaking" may be required to allow the change to take place cleanly, and thus avoid any incorrect operation of the code executing in the non-secure domain.

It will be appreciated that whilst one particular embodiment has been described with reference to FIGS. 1 to 4, a number of variations could be made. As mentioned earlier, the writeable memory may be defined as having more than one RORAM region. Further, overlapping RORAM regions may be defined with different trusted code having write control of one or more different such RORAM regions.

Further, in some embodiments, it may be considered that the trusted code used to load the content into the RORAM region is only trusted during a critical stage of the boot process. After that stage, no further modifications may be made to the RORAM region and all accesses could be considered to be read only.

As a variation on this, part of the non-trusted operating system initialisation routine may be considered as being trustworthy, because it has been checked, and because the system is still closed. A "closed" environment is one where all operations are verified as having come from a trustworthy source. A fully closed operating system environment only runs code that has been authenticated. The code in the chip that scans a PC keyboard is a closed environment. An open operating system runs code that has been downloaded from any source. Windows PCs are an open environment. An open operating system may be considered closed at a certain point in its life, i.e. there is a stage when it is still starting before it allows the running of externally sourced code, and at that point it may still be trusted as a closed environment. Such operating system initialisation code could run using the memory as RAM, and once complete, the secure domain would then (and only then) specify the read only region to ensure that from that point on the content stored in the read only region could not be written to from the non-secure domain.

The memory device containing the RORAM region may take a variety of forms. In one embodiment, it may be a peripheral device which the trusted code may control, but the non-trusted operating system may have read only use for data. Possible examples might be an Ethernet device or a system level MMU device with read only exposed page tables.

In one embodiment, the memory device containing the RORAM region may be slower memory, for example FLASH memory, which the trusted code may control but the normal operating system code may have read only use for data. This still provides significant benefits, since the integrity of the data can be maintained through the access control mechanisms described previously.

In one embodiment, the RORAM region may be loaded with content without performing block signature checking if the code or data being transferred from the slow speed storage device is felt to have trustable integrity.

In one embodiment, a bus master peripheral may be designed that uses DMA-like techniques to load content into the RORAM region. Such a device may use block signature checking if the source integrity is not innately trusted.

The arrangement of the RORAM regions may take a variety of forms. Indeed, in one embodiment, the RORAM segmenting may be applied on a memory page basis.

In one embodiment, prior to restarting non-trusted execution after loading content into the read only region, the trusted operation may additionally be arranged to perform checks on the content in the read/write region 122 of the RAM memory 120. This may reduce the required changes to the non-secure operating system because the operating system no longer has to call the secure domain to perform memory operations, but now only needs to call the secure domain once some operation is complete.

As mentioned previously, an individual memory device may have one or more read only regions defined therein, or indeed for some devices, for example FLASH, FeRAM, EEPROM type devices, etc it may be appropriate for the entire "RAM" device address range to be specified as a RORAM region.

Figure 5:
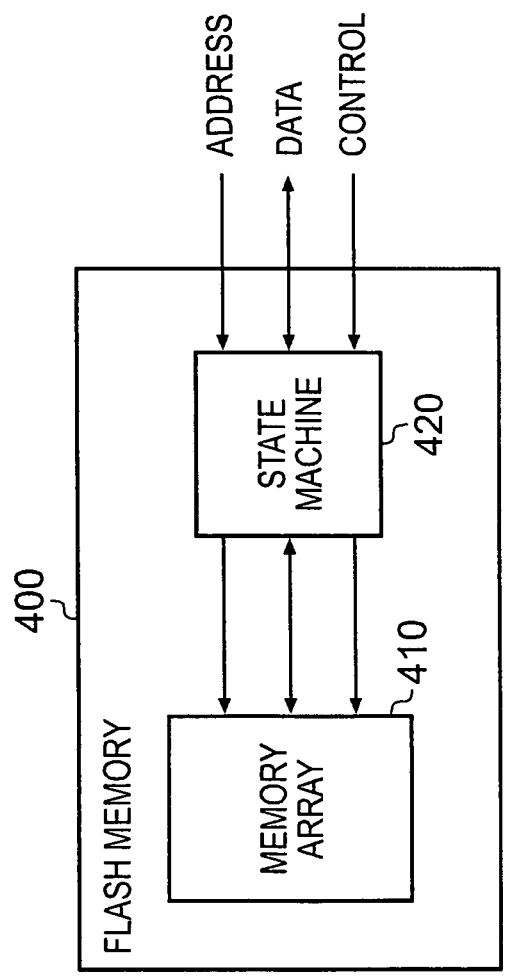
FIG. 5 is a diagram schematically illustrating a structure of a FLASH memory device to which an example embodiment can be applied.

One particular embodiment where one of the memory devices 50, 60 is a FLASH memory device, and where the entire address range of the FLASH memory device is specified as a RORAM region, will now be described with reference to FIGS. 5 and 6. FIG. 5 is a diagram illustrating elements found within a typical FLASH memory 400. In particular, a FLASH memory 400 typically consists of a memory array comprising a number of memory segments 410, with the reading and writing to those memory segments being controlled by a state machine 420 within the FLASH memory 400. Depending on the type of FLASH memory device, some of the control, address and data signals may be provided to the state machine and memory array in parallel.

Up until now, it has been difficult to effectively use within a data processing apparatus having a secure domain and a non-secure domain a FLASH memory device. This is due to the fact that for write accesses the addresses being accessed within the FLASH memory device cannot readily be deduced from the format of the access request issued to the FLASH memory device. In particular, FLASH commands (block erase, copy, write, etc) are signified by an initial write transfer, and these flash commands do not themselves specify an address. A command sequence may then consist of a number of read and write transfers, and no other read or writes must take place whilst that command is being performed.

Figure 6:
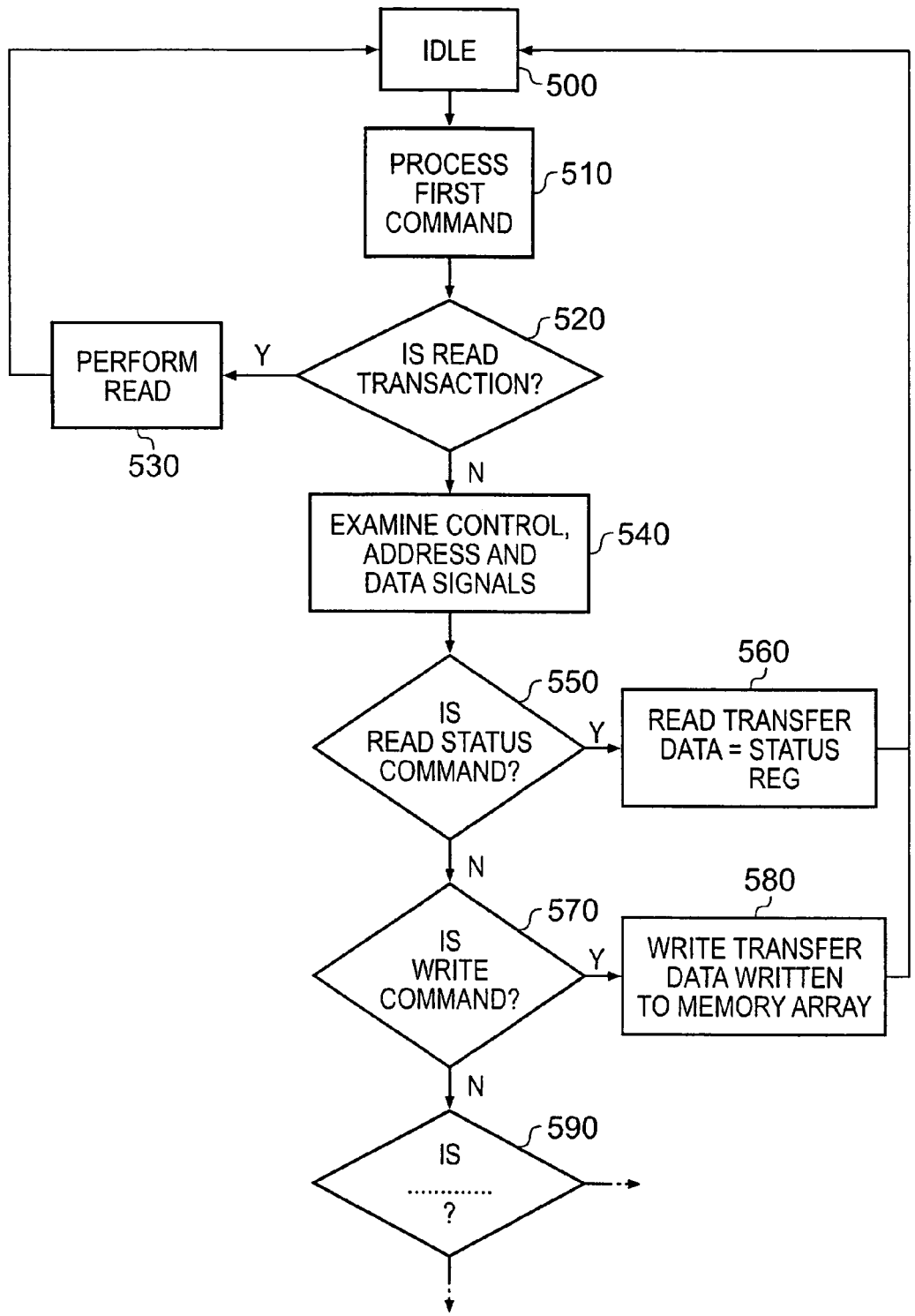
FIG. 6 is a diagram schematically illustrating the operation of the state machine of FIG. 5.

FIG. 6 illustrates the operation of the state machine 420 of FIG. 5 when handling such FLASH commands. As shown in FIG. 6, at step 500 the state machine is in the idle state, and proceeds to step 510 when a first command is received. The first command is processed, as a result of which it can be determined whether that first command is a read command of a read transaction or instead is a write command forming the first command of some other transaction. Accordingly, at step 520, it can be determined if the first command indicates a read transaction, and if so the read transfer is performed at step 530, whereafter the state machine returns to the idle state 500.

However, if the first command were instead a write command, then the process proceeds to step 540, where the signals on the control, address and data paths are examined for the next command received in order to determine what type of transaction is being performed. In particular, for a single transaction to be performed, a number of commands may need to be issued. As an example, writing data to FLASH memory involves issuing a first write command followed by a second write command, the second write command specifying a data word to be transferred. Similarly, to execute a read status transaction which is used to determine if a write transaction has completed, this involves issuing a write command followed by a read command. To assess the nature of the second command, the control, address and data signals need to be analysed at step 540.

If following such analysis, it is determined at step 550 that the second command is a read status command, then the process proceeds to step 560, where a read transfer takes place, with the data transferred being the contents of a status register indicating the status of the write transaction. Thereafter, the process returns to the idle state at step 500.

If at step 550, it is determined that the command is not a read status command, then at step 570 it is determined whether the command is a write command specifying a data value to be written. If so, then a write transfer is performed at 580 to write the data word into the memory array 410, whereafter the process returns to the idle state 500. Subsequent data words can be written by issuing additional write commands.

It will be appreciated that a number of further commands may be specified by the second command, as indicated schematically by the decision box 590.

At the time write FLASH commands are issued, it is not possible for an MPU external to the FLASH memory device to reliably identify what content is seeking to be accessed, and even when the addresses are subsequently identified on the address bus they may be identified with reference to segment identifiers, which again may not readily be understood by the MPU 40. As a result, in known systems, it would be possible for write FLASH commands to be submitted from the non-secure domain, with these commands being used to copy data from a secure region to a non-secure region within the FLASH memory, thereby allowing access from the non-secure domain to secure content.

However, through use of the technology described herein, such problems are alleviated, since the FLASH memory device can be established with a read only region where applications running in the non-secure domain will only have read access to the content therein. For such read accesses, known mechanisms can then be used to ensure that any secure content in the read only region is not accessed from the non-secure domain. Additionally, for at least certain secure tasks in the secure domain, read and write access can be allowed to that region to allow the content to be updated under the control of that secure task. By virtue of the technology described herein, it will be appreciated that any write transaction issued by an application from the non-secure domain will be aborted by the RORAM access control bridge 130.

In one embodiment, the secure task that is allowed to update content in the RORAM region is executed in a secure privileged mode. In such embodiments, it is possible to arrange the system such that in addition to any write transactions issued from the non-secure domain, any write transactions issued by non-privileged modes of operation in the secure domain are also blocked by the access control bridge 130.

In one embodiment, the trusted operation used to load content into the RORAM region of the FLASH memory is a secure privileged non-re-entrant function. Such a function is managed by a key/semaphore to ensure that whilst that function has access to the read only region, no other function can access the read only region at the same time.

Using the process described earlier with reference to FIG. 4, programs executing in the non-secure domain that need to write to the FLASH memory can call the secure FLASH command function to seek to have the relevant content written to the FLASH memory, and that secure FLASH command function will then check the security of any commands submitted to it prior to allowing the transaction specified by those commands to proceed. Such an approach protects the FLASH memory from non-secure FLASH command attacks, whilst still providing a technique for applications running in the non-secure domain to access FLASH memory.

Although particular example embodiments have been described herein, it will be apparent that the claims are not limited thereto, and that many modifications and additions may be made within the scope of the claims.

We claim:

1. A data processing apparatus having a secure domain and a non-secure domain, in the secure domain devices of the data processing apparatus having access to secure content which is not accessible in the non-secure domain, the data processing apparatus comprising:
at least one device configured when seeking to access content stored in memory to issue a memory access request pertaining to either said secure domain or said non-secure domain;
writeable memory configured to store content required by the at least one device, the writeable memory having at least one read only region accessible to both said secure domain and said non-secure domain whose content is stored therein under control of a secure task, the secure task being a task executed by one of said at least one devices in the secure domain; and
protection logic configured to receive a memory access request seeking to access content in the at least one read only region, to prevent access to the at least one read only region if that memory access request pertains to said non-secure domain and is seeking to write content to said at least one read only region, and to allow access to the at least one read only region if that memory access request pertains to said secure task and is seeking to write content to said at least one read only region,
wherein if a non-secure task being a task executed by said at least one device in the non-secure domain wishes to write content to the at least one read only region, the device on which that task is executing is configured to trap the corresponding memory access request and to cause that memory access request to be handled by said secure task.

2. A data processing apparatus as claimed in claim 1, further comprising:
a device bus on to which the at least one device is configured to issue said memory access request; and
the writeable memory being coupled to the device bus via the protection logic.

3. A data processing apparatus as claimed in claim 1, wherein:
at least one of said at least one devices is configured in a plurality of modes, including at least one non-secure mode being a mode in the non-secure domain and at least one secure mode being a mode in the secure domain; and
the secure task used to control storage of content in the at least one read only region is executed in a predetermined secure mode.

4. A data processing apparatus as claimed in claim 3, wherein in said non-secure domain said at least one of said at least one devices is configured under the control of a non-secure operating system, and in said secure domain said at least one of said at least one devices is configured under the control of a secure operating system.

5. A data processing apparatus as claimed in claim 1, wherein said secure task is configured to control storage of content in the at least one read only region during a boot process.

6. A data processing apparatus as claimed in claim 5, wherein the content comprises program code to be executed by said at least one device in the non-secure domain, and said secure task is configured to cause that program code to be written into the at least one read only region from a storage device during the boot process.

7. A data processing apparatus as claimed in claim 6, wherein the secure task is further configured to cause a verification process to be performed on the program code.

8. A data processing apparatus as claimed in claim 1, wherein the secure task is configured to perform a verification process in order to check that the memory access request is not seeking to access secure content, and provided secure content is not seeking to be accessed, is configured to issue the memory access request.

9. A data processing apparatus as claimed in claim 1, wherein said writeable memory is formed by a plurality of memory devices.

10. A data processing apparatus as claimed in claim 1, wherein one of said at least one read only regions is provided within a peripheral device controllable by code executing in the secure domain.

11. A data processing apparatus as claimed in claim 1, wherein the writeable memory comprises a FLASH memory device and the at least one read only region comprises the entire FLASH memory device, whereby a non-secure task being a task executed by said at least one device in the non-secure domain can only read content in the FLASH memory device.

12. A data processing apparatus as claimed in claim 11, wherein each memory access request has a domain signal associated therewith identifying whether the memory access request pertains to the secure domain or the non-secure domain, and the protection logic is configured to reference the domain signal in order to determine whether the memory access request pertains to the non-secure domain.

13. A data processing apparatus as claimed in claim 1, wherein each read only region is defined by a secure task in the secure domain.

14. Memory logic circuitry for a data processing apparatus having a secure domain and a non-secure domain, where in the secure domain, devices of the data processing apparatus have access to secure content which is not accessible in the non-secure domain, the data processing apparatus having at least one device configured when seeking to access content stored in the memory logic to issue a memory access request pertaining to either said secure domain or said non-secure domain, the memory logic comprising:

writeable memory configured to store content required by the at least one device, the writeable memory having at least one read only region accessible to both said secure domain and said non-secure domain whose content is stored therein under control of a secure task, the secure task being a task executed by one of said at least one devices in the secure domain; and protection logic circuitry configured to receive a memory access request seeking to access content in the at least one read only region, to prevent access to the at least one read only region if that memory access request pertains to said non-secure domain and is seeking to write content to said at least one read only region, and to allow access to the at least one read only region if that memory access request pertains to said secure task and is seeking to write content to said at least one read only region, wherein if a non-secure task being a task executed by said at least one device in the non-secure domain wishes to write content to the at least one read only region, the device on which that task is executing is configured to trap the corresponding memory access request and to cause that memory access request to be handled by said secure task.

15. A data processing apparatus having a secure domain and a non-secure domain, where in the secure domain, device means of the data processing apparatus have access to secure content which is not accessible in the non-secure domain, the data processing apparatus comprising:

at least one device means for issuing a memory access request pertaining to either said secure domain or said non-secure domain when seeking to access content stored in memory means;

writeable memory means for storing content required by the at least one device means, the writeable memory means having at least one read only region accessible to both said secure domain and said non-secure domain whose content is stored therein under control of a secure task, the secure task being a task executed by one of said at least one device means in the secure domain; and protection means for receiving a memory access request seeking to access content in the at least one read only region, for preventing access to the at least one read only region if that memory access request pertains to said non-secure domain and is seeking to write content to said at least one read only region, and for allowing access to the at least one read only region if that memory access request pertains to said secure task and is seeking to write content to said at least one read only region, wherein if a non-secure task being a task executed by said at least one device means in the non-secure domain wishes to write content to the at least one read only region, the device means on which that task is executing is configured to trap the corresponding memory access request and to cause that memory access request to be handled by said secure task.

16. A method of managing access to content in a data processing apparatus having a secure domain and a non-secure domain, where in the secure domain, devices of the data processing apparatus have access to secure content which is not accessible in the non-secure domain, the method comprising the steps of:

providing within a writeable memory at least one read only region;

storing content within the at least one read only region accessible to both said secure domain and said non-secure domain under control of a secure task, the secure task being a task executed in the secure domain; and when a memory access request is issued seeking to access content in the at least one read only region, preventing access to the at least one read only region if that memory access request pertains to said non-secure domain and is seeking to write content to said at least one read only region, and allowing access to the at least one read only region if that memory access request pertains to said secure task and is seeking to write content to said at least one read only region, wherein if a non-secure task being a task executed by a device in the non-secure domain wishes to write content to the at least one read only region, the device traps the corresponding memory access request and to cause that memory access request to be handled by said secure task.

17. A data processing apparatus as claimed in claim 1, wherein the content is stored in said at least one read only region by said secure task.

18. A data processing apparatus as claimed in claim 1, further comprising a trusted task executed by one of said at least one devices in the non-secure domain, the trusted task being configured to write content into at least one region of said writeable memory, and thereafter the secure task being configured to control storage of content in said at least one read only region by defining said at least one region to be said at least one read only region.

19. A data processing apparatus as claimed in claim 18, wherein the trusted task is only trusted for a particular stage of operation.

\* \* \* \* \*